June 2, 1959
J. R. EVANS
2,888,949
FLOW CONTROL DEVICE
Filed April 25, 1957
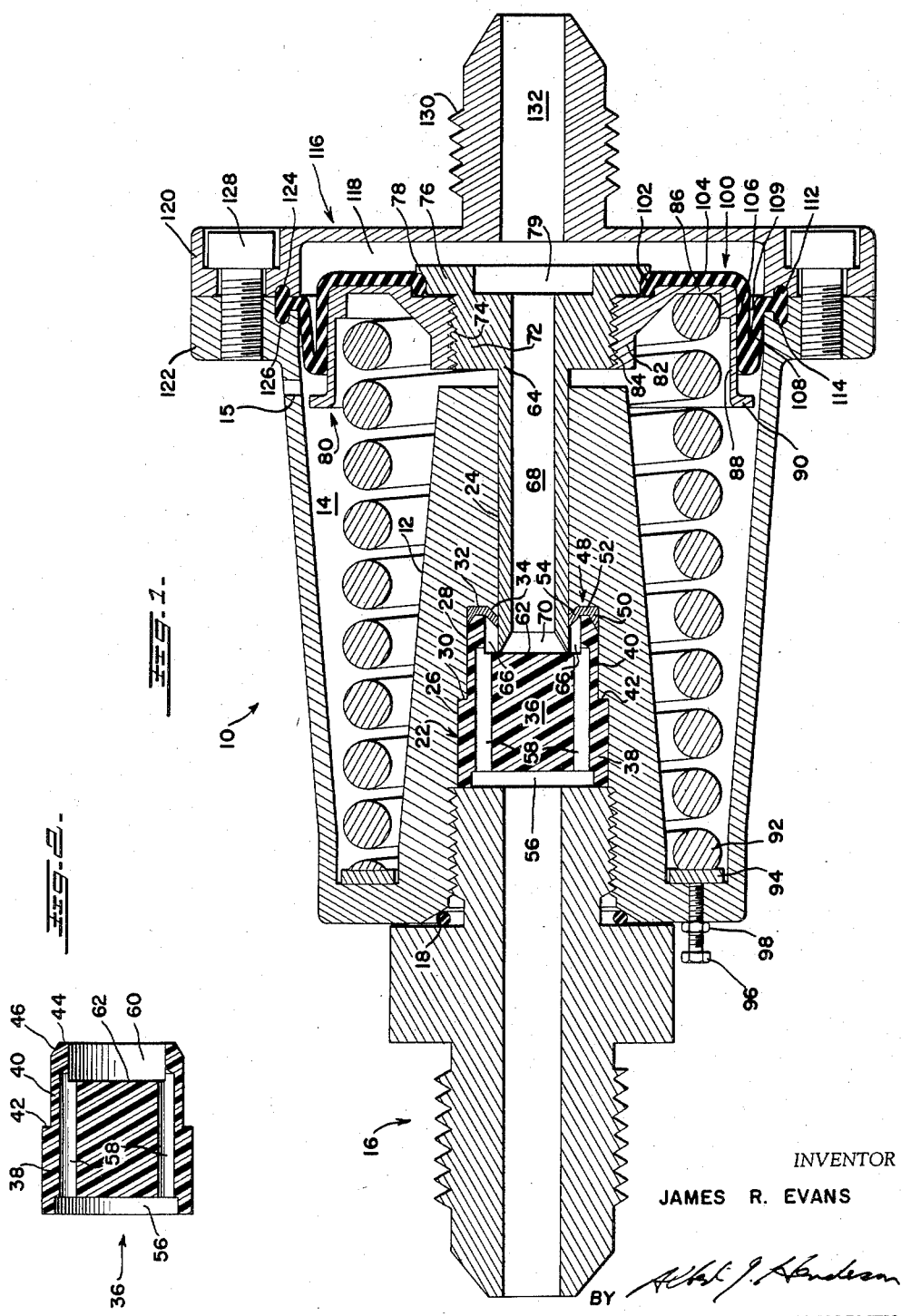
INVENTOR
JAMES R. EVANS
BY *[signature]*
ATTORNEY United States Patent Office 2,888,949
Patented June 2, 1959

2,888,949

FLOW CONTROL DEVICE

James R. Evans, Long Beach, Calif., assignor to Robertshaw-Fulton Controls Company, Greensburg, Pa., a corporation of Delaware Application April 25, 1957, Serial No. 655,120

2 Claims. (Cl. 137—505.25)

This invention relates to flow control devices and more particularly to pressure regulators of the type requiring a high pressure reducer for oxygen breathing apparatus.

It is an object of this invention to increase the sensitivity of a pressure regulating device.

An additional object of the invention is to utilize the outlet pressure of a flow control device in balancing the valve operation thereof.

This invention has a further object in that the pressure responsive means of a regulating device is positioned in direct communication with the outlet fluid to effect an immediate and accurate response of the valve member of the pressure regulating device.

Another object of this invention is to stabilize the movement of a throttling means in a flow control device.

A further object of this invention is to throttle a flow of fluid in a flow control device by axial movement of a hollow valve member in a recessed compartment.

Other features and advantages will become apparent from the following description taken in connection with the accompanying drawing in which Fig. 1 is a longitudinal section view and Fig. 2 is a sectional view showing certain details of Fig. 1.

The pressure regulator comprises a truncated conical housing, indicated generally at 10, provided with an internal conical axial frustrum 12 forming a wedge-shaped annular recess 14 therebetween. The recess 14 is vented to the atmosphere by a plurality of radially spaced apertures 15 (only one being shown) extending through housing 10 near its base portion. A centrally bored inlet fitting 16 is threaded into one end of housing 10 and frustrum 12, and an O-ring seal 18 is compressed between adjacent surfaces of frustrum 12 and fitting 16. An axially extending bore through frustrum 12 includes an inlet passage 22 and an outlet passage 24. Inlet passage 22 consists of an outer cylindrical portion 26 and an inner cylindrical portion 28 of reduced diameter separated by a medially spaced annular shoulder 30. Cylindrical portion 28 terminates at a second annular shoulder 32 having a projecting tapered annulus 34 surrounding the outlet passage 24.

As is illustrated in the drawing, a plug member 36 of any suitable material, such as nylon, has a peripheral shape that conforms to the internal configuration of inlet passage 22. Plug member 36 includes an outer cylindrical portion 38 and an inner cylindrical portion 40 separated by a medially spaced annular shoulder 42. The terminus 44 of inner portion 40 is provided with a tapered section 46 spaced from, and sloped perpendicularly to, the slope of tapered annulus 34. The axial length of the plug's inner portion 40 is less than the axial length of inlet passage's inner portion 28 so that there is sufficient space between shoulder 32 and terminus 44 for the positioning of seal 48 made of any suitable sealing material, such as rubber. As viewed in cross-section, the shape of seal 48 includes an outer section 50 decreasing in thickness on one side to conform to the plug's tapered section 46, an intermediate section 52 of constant thickness to conform to the plug's terminus 44, and an inner section 54 of constant thickness angularly disposed relative to intermediate section 52 to conform to the inlet passage's tapered annulus 34. In assembly, the plug inner portion 40 slightly compresses seal 48 when its shoulder 42 abuts the inlet passage shoulder 30 and inlet fitting 16 contacts the outer end of plug 36 to retain the elements in assembled relationship.

The outer end of plug 36 is provided with a central recess or inlet cavity 56 communicating with the bore of inlet fitting 16, and a plurality of cylindrical bores 58, radially arranged in plug 36, define passages communicating with central recess or inlet cavity 56. The passages 58 extend axially inwardly of plug 36 and taperingly terminate in spaced relation to the plug terminus 44.

The inner end of plug 36 is provided with a central recess 60 extending from terminus 44 into the cylindrical bores 58 for a short distance, thus defining an exposed arcuate section on the inner ends of bores 58. As is shown in the drawing, the diameter of recess 60 is greater than the diameter of outlet passage 24, greater than the inner diameter circumscribed by the radially arranged cylindrical bores 58, but less than the outer diameter so circumscribed. Thus, the circumference of recess 60 intersects the bores 58 to coincide approximately with the median circumference circumscribed by the central longitudinal axes of the radially arranged cylindrical bores 58.

A movable valve member 64 is slidably disposed in outlet passage 24 with its inner end extending into plug recess 60 to cooperate with valve seat 62. Because the diameter of recess 60 is greater than the diameter of valve member 64, an annular fluid compartment 66 is formed therebetween and sealed by the inner section 54 of annular seal 48. Longitudinal movement of valve member 64 away from valve seat 62 opens fluid compartment 66 to permit flow therefrom. A centrally disposed bore 68 extending longitudinally through valve member 64 has a flared inlet portion 70, through which flow of a fluid from compartment 66 is throttled in accordance with the longitudinal position of valve member 64.

The outer end of valve member 64, positioned exteriorly of frustrum 12, includes an enlarged cylindrical section 72 having external threads 74 on one end and an annular flange 76 with an annular lip on its opposite end 78. The outer end of the valve section 72 is recessed to form an annular cavity 79 which is on the same longitudinal axis as and communicates with the valve bore 68. A generally cup-shaped retainer member 80 has a central boss 82 with an internally threaded bore 84 for mating with threads 74, a flat section 86, and an outer wall section 88 with an outwardly disposed flange 90 formed perpendicularly on its free end. Yieldable means in the form of a resilient coil spring 92 is positioned in recess 14 and surrounds the frustrum 12. One end of spring 92 engages the inner surface of the retainer's flat section 86 while its opposite end engages an annular tension plate 94 which is adjustable by plurality of radially spaced bolts 96 (only one being shown) threaded into locknuts 98 (only one being shown) and extending through the truncated top section of housing 10 to engage tension plate 94.

A flexible diaphragm 100 of any suitable material, such as rubber, is formed in the shape of an annulus. The internal rim of diaphragm 100 is provided with an annular rib 102 which is compressed by flange 76 into a pocket formed between adjacent surfaces of the valve member's enlarged section 72 and the retainer's boss 82. The diaphragm's flat section 104 engages the upper surface of the retainer's flat section 86 and is joined to an outer cylindrical wall 106 engaging the outer surface of the retainer's wall section 88. At its lower end, diaphragm wall 106 is everted and continued as an upwardly tapering cylindrical wall 108 to form a substantially V-shaped recess 109 therebetween as viewed in cross-section. The V-shaped annular recess 109 permits the diaphragm to operate with a rolling action The upper terminal of wall 108 projects perpendicularly outwardly therefrom and is formed with upper and lower annular rib, 112 and 114, respectively.

An end cover 116 is internally recessed to provide a diaphragm chamber 118 and an annular flange 120 which is positioned adjacent an annular flange 122 on housing 10. Complementary annular recesses 124 and 126 in flanges 120 and 122, respectively, form oppositely disposed sealing grooves for the ribs 112 and 114 of the diaphragm 100. The end cover 116 is secured to housing 10 by any suitable fastening means, such as bolts 128, clamping the flanges 120 and 122 together. An outlet fitting 130 is an integral part of end cover 116 and is centrally bored at 132 on the same longitudinal axis as the valve bore 68, cavity 79, and diaphragm chamber 118.

In the operation of the pressure regulator of the present invention, a source of high pressure fluid (not shown) is connected to inlet fitting 16 while fluid consuming means (not shown) is connected to outlet fitting 130. The high pressure fluid entering inlet fitting 16 flows into plug recess 56 and then through each of the cylindrical bores 58 whose tapering ends deflect it into fluid compartment 66. Fluid pressure in the fluid or throttling compartment 66 acts against the inner section 54 of annular seal 48 whereby inner section 54 is compressed against the exterior of valve member 64 to seal effectively inlet passage 22 from outlet passage 24. Thus, when valve member 64 is in its fully closed position as shown in the drawing, the fluid flow is completely cut off.

Longitudinal movement of valve member 64 to an open position separates its inlet portion 70 from plug valve seat 62 and permits the high pressure fluid to flow into the valve bore 68. The fluid leaving bore 68 flows into cavity 79 and diaphragm chamber 118 from which it is delivered through bore 132 of outlet fitting 130. As is apparent, the presence of fluid internally of valve member 64 in its valve bore 68, and the presence of fluid externally of valve member 64 in cavity 79, diaphragm recess 109, and diaphragm chamber 118, substantially establishes a fluid envelope for the valve member 64. Thus longitudinal movement of valve member 64 in outlet passage 24 is not impeded by any non-axial forces so that valve member 64 is stabilized to operate smoothly and rapidly between regulating positions.

The compression of coil spring 92 is adjusted by means of plate 94 and bolts 96 in accordance with the outlet pressure which it is desired to maintain. With no flow of fluid, the biasing force exerted by spring 92 moves valve member 64 to its fully open position which provides a maximum displacement between the valve inlet portion 70 and the plug seat 62. With flow of fluid, the outlet pressure is instantly sensed by diaphragm 100 and the force exerted thereby moves valve member 64 against the biasing force of spring 92 towards the plug seat 62. This restricts the clearance between the valve member and valve seat to throttle the fluid flow from fluid compartment 66 to the bore 68 of the hollow valve member 64. When the outlet pressure exerts a force on diaphragm 100 that is equal to the biasing force exerted by spring 92, the valve member 64 is in a state of equilibrium and the outlet fitting 130 delivers the fluid at a constant pressure. In the event there is a decrease in the pressure of the fluid supplied to inlet fitting 16, the pressure on diaphragm 100 will be decreased causing spring 92 to bias valve member 64 toward its fully open position whereby the pressure differential between inlet pressure and outlet pressure is reduced.

Direct communication of fluid flow between the outlet of hollow valve member 64 and the pressure responsive means assures the instantaneous response thereof with a high degree of sensitivity so that the position of valve member 64 relative to plug seat 62 is precisely and automatically determined by the outlet pressure. Even though the diaphragm 100 directly senses the outlet pressure, it is not positioned in the path of the fluid flow and consequently is not subject to any impinging effect of the fluid flow, which would needlessly unbalance the state of equilibrium of valve member 64.

Only one embodiment of the invention has been shown and described herein and inasmuch as this invention is subject to many variations, modifications, and reversal of parts, it is intended that all matter contained in the above description of the embodiment shown and described shall be interpreted as illustrative and not in a limiting sense.

It is claimed and desired to secure by Letters Patent:

1. In a pressure regulating device for controlling a flow of fluid, the combination comprising a housing having an inlet passage, an outlet passage, communicating therewith and a diaphragm chamber associated with the outlet passage, sealing means disposed in the inlet passage, a plug member disposed in the inlet passage and engaging said sealing means, one end of said plug member having an inlet cavity and an opposite end of said plug member having a throttling compartment, a plurality of passages extending through said plug member and establishing communication between the inlet cavity and the throttling compartment, a movable valve member disposed in the outlet passage and having an inner end extending into the throttling compartment and an outer end extending into the diaphragm chamber, means defining a bore extending from the inner end to the outer end of said valve member whereby the flow of fluid therethrough balances the movement thereof, yieldable means in said housing constantly urging said valve member to move in one direction, and a diaphragm in said diaphragm chamber operatively connected to said valve member and constantly acting in opposition to said yieldable means so that equilibrium between said yieldable means and said diaphragm automatically determines the position of the end of said valve member in said throttling compartment.

2. In a pressure regulating device, the combination comprising a housing, an inlet passage extending into said housing, an annular shoulder in said housing forming a bottom wall of said inlet passage, an outlet passage in said housing intersecting said bottom wall to establish communication with said inlet passage, a valve member slidably disposed in said outlet passage and having an end portion extending through said bottom wall into said inlet passage, an annular seal engaging said bottom wall and having an inner periphery sealingly engaging said valve member adjacent the end portion thereof, a plug member in said inlet passage engaging said annular seal and forming a seat for said valve member, an inlet cavity on an outer end of said plug member and a throttling compartment on an inner end thereof, a plurality of passages in said plug member establishing communication between the inlet cavity and the throttling compartment whereby a flow of fluid into the throttling compartment compresses the inner periphery of said annular seal against said valve member, a coil spring mounted in compression and being operatively connected to said valve member for constantly urging the same in one direction, and an annular diaphragm having an inner portion operatively connected to said valve member for constantly urging the same in opposition to said coil spring and an outer recessed portion formed with a V-shape cross-section.

References Cited in the file of this patent

UNITED STATES PATENTS

| | | |
|---|---|---|
| 399,548 | Nageldinger | Mar. 12, 1889 |
| 614,441 | Burnett | Nov. 22, 1898 |
| 2,659,381 | Seljos | Nov. 17, 1953 |
| 2,678,662 | Boteler | May 18, 1954 |